United States Patent

[11] 3,609,499

[72] Inventors Ronald C. Scheerer
 Baltimore;
 Roger L. Woods, Glen Burnie, both of Md.
[21] Appl. No. 33,025
[22] Filed Apr. 29, 1970
[45] Patented Sept. 28, 1971
[73] Assignee The United States of America as represented by the Secretary of the Navy

[54] ELECTRONIC CHOPPER CIRCUIT
 9 Claims, 2 Drawing Figs.
[52] U.S. Cl. .................................................... 318/684,
 307/255, 318/663
[51] Int. Cl. .................................................... G05b 11/12
[50] Field of Search ............................................. 318/663,
 599, 684; 321/44; 307/240, 255

[56] References Cited
UNITED STATES PATENTS
| | | | |
|---|---|---|---|
| 2,938,174 | 5/1960 | Bulleyment .................. | 318/684 X |
| 3,227,892 | 1/1966 | Basham ......................... | 307/240 |
| 3,287,620 | 11/1966 | Tuszynski ..................... | 307/255 X |
| 3,454,850 | 7/1969 | Miller ............................ | 307/240 X |

Primary Examiner—B. Dobeck
Attorneys—R. S. Sciascia and Henry Hansen

ABSTRACT: A servo system utilizing an electronic chopper for producing shaft rotation indicative of the amplitude of a DC input signal. The DC signal is converted to square wave form by shunting the signal through a complementary pair of transistors to ground. A constant AC signal applied to the input bases of the transistors determines the frequency of the shunting action which in turn determines the frequency of the square wave. The square wave signal is amplified and applied to a servo motor for driving a potentiometer indicator in accordance with the amplitude of the DC input signal.

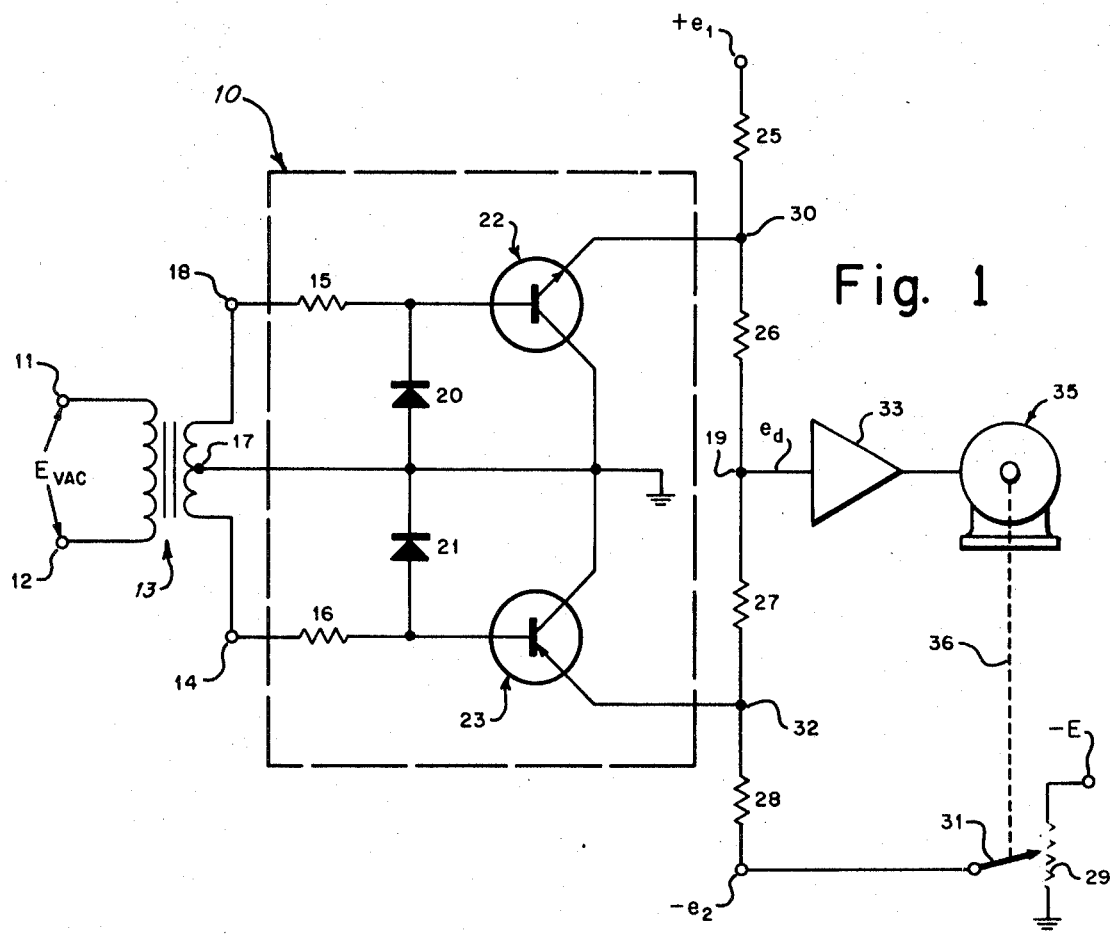
Fig. 1
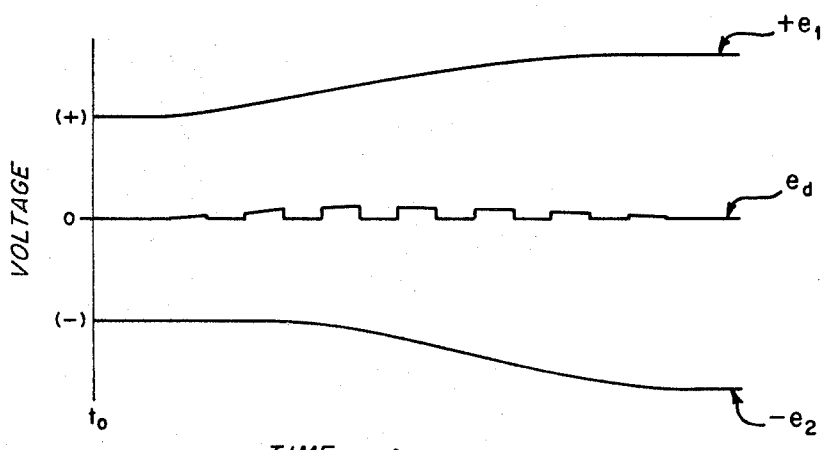
Fig. 2
INVENTORS
RONALD C. SCHEERER
ROGER L. WOODS
ATTORNEY

ELECTRONIC CHOPPER CIRCUIT

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates to servomechanism systems in which a servomotor is used to position an indicating device by the angular position of the motor shaft. More particularly, the invention pertains to a chopper circuit used within such a system in order to convert a DC input signal to a pulsating square wave signal.

In many areas of electrical circuit design there arises a need for some type of chopping device for producing square wave pulses within a DC signal envelope. The electromechanical chopper was perhaps the first means for accomplishing this. It has a coil which is excited with an AC voltage which causes a wiper arm that is grounded at one end to alternately switch between a first and a second contact. On positive half cycles of the excitation the magnetic field is set up in such a direction to cause the wiper arm to swing to the first contact. On negative half cycles the magnetic field is in the opposite direction and the wiper arm swings to the second contact. This switching action continues as long as the excitation is applied. It can, therefore, be seen that by this manner a DC signal applied to either the first or second contact is periodically grounded thereby causing a pulsating square wave to result. In some applications such a device is unsuitable due to its physical size, wiper contact bounce in moving from contact to contact which causes unwanted disturbances, and wearing out of components. In addition, the external mounting hardware makes the device incompatible with certain types of printed circuit board applications. More recently single transistors have been used as choppers but even these have the drawback of only permitting either positive or negative DC voltages to be applied as an input to a servosystem. They will not permit both.

SUMMARY OF THE INVENTION

It is therefore an object of the present invention to provide a chopper circuit that has the ability to handle both positive and negative voltages simultaneously. This feature makes it very practical for its primary use has been in a DC positioning servo loop. In the servosystem a plus and a minus DC voltage representing a DC information input signal and DC feedback signal, respectively, are applied to opposite ends of a resistive circuit. When a null position has been attained the centerpoint on the resistive circuit receives a zero voltage. At other times a plus or a minus pulsating voltage is received at the centerpoint. The chopper circuit makes the applied plus voltage or the applied minus voltage a square wave signal. In this way the pulsating signal can use an AC amplifier and the amplified signal can be applied to a positioning motor. The chopping circuit grounds the voltages by creating a shunt path to ground for both DC voltages.

BRIEF DESCRIPTION OF THE DRAWING

FIG. 1 shows a schematic block diagram of a preferred embodiment of the present invention; and FIG. 2 shows a typical voltage vs Time curve at selected points in the system.

DESCRIPTION OF THE PREFERRED EMBODIMENT

FIG. 1 shows in general an electronic system 10 which is a part of a DC positioning servo loop. An AC voltage $E_{vac}$ is applied across primary winding terminals 11 and 12 of transformer 13. The secondary winding of transformer 13 is connected at opposite terminals 18 and 14 to one side of resistors 15 and 16. A center tap 17 on the secondary winding of the transformer 13 is grounded. A pair of diodes 20 and 21 are connected between the other side of the resistors 15 and 16 and ground. Also respectively connnected to the diodes side of resistors 15 and 16 are transistors 22 and 23 with transistor 22 being of the NPN-type and transistor 23 being a PNP-type the collectors of the two transistors are joined together and grounded.

Resistors 25, 26, 27, 28 and potentiometer 29 are connected in series with a plus DC input voltage $+e_1$ being applied to one end of the resistor 25 and a minus voltage $-E$ being applied to one end of potentiometer 29. The value of the resistance of resistors 25 plus 26 is equal to the resistance of 27 plus 28. A potentiometer wiper arm 31 is connected to indicating potentiometer 29 picking off a voltage between the voltage $-E$ at one end of the potentiometer and ground at the other end. When the system is balanced, a negative feedback voltage $-e_2$ equal in magnitude with $+e_1$ but of opposite polarity is between the potentiometer 29 and resistor 28. The emitter of transistor 22 is connected to point 30 located between resistors 25 and 26 and the emitter of transistor 23 is connected to point 32 located between resistors 27 and 28. A conventional AC amplifier 33 for amplifying a square wave signal has its input connected between resistors 26 and 27 and output connected to a servomotor 35 that can be driven in either direction depending on the polarity of the applied signal. Servomotor 35 has a positioning arm 36 connected to wiper arm 31.

The operation of the device will now be explained. The stepdown transformer 13 reduces in the secondary winding the voltage $E_{vac}$ that is applied to the primary winding. When the generated secondary voltage is at positive half cycles, point 18 will be positive with respect to ground and point 14 will be negative with respect to ground. This voltage polarity at points 18 and 14 will cause transistors 22 and 23 to conduct simultaneously grounding points 30 and 32 through the respective transistors 22 and 23. On negative half cycles the polarity of both points 18 and 14 will be negative, positive respectively. In this polarity configuration transistors 22 and 23 will not conduct, therefore removing the ground from points 30 and 32. This allows the DC voltages $+e_1$ and $-e_2$ as shown in FIG. 2 to be applied to amplifier 33. This off-on action of transistors 22 and 23 yields a square wave signal $e_d$ at point 19 that is made up of the difference in the magnitude of $+e_1$ and $-e_2$ divided by two and has the same polarity as the larger of $+e_1$ and $-e_2$. This square wave signal $e_d$ is amplified by amplifier 33 and the output of amplifier 33 then drives the motor 35. The direction of rotation of the motor depends on whether the resulting signal $e_d$ is positive or negative. For any particular value of input signal $+e_1$ the motor will continue to drive the followup potentiometer until $-e_2$ is equal to the magnitude of $+e_1$ but of opposite polarity. The signal $e_d$ at point 19 then becomes essentially zero and the motor will no longer be driven. The diodes 20 and 21 have been added to protect the transistors 22 and 23 so that the maximum reverse collector to base reading is not exceeded during the negative half cycles of the transformer 13 voltage. The values of resistances 15 and 16 are selected so that sufficient base current can be delivered to transistors 22 and 23 to saturate the transistors. Using transistors 22 and 23 in their inverted mode of operation use a low value of collector-emitter saturation voltage.

It can therefore be seen that a chopper circuit can be used in a device in which a difference voltage is to be applied at the input to an amplifier. This gives all the advantages of using an AC amplifier in a device where the input signals are two DC signals.

The device in addition to its present application also has use in synchronous modulating/demodulating circuits and pulse width modulators. It can also be seen that by making the sizes of the resistors connected between $+e_1$ and point 19 unequal to the resistors between $-e_2$ and point 19 a null voltage at point 19 could be obtained with $+e_1$ and $-e_2$ of different magnitudes.

Obviously many modifications and variations of the present invention are possible in the light of the above teachings. It is therefore to be understood that within the scope of the appended claims the invention may be practiced otherwise than as specifically described.

What is claimed is:

1. An electronic chopper circuit comprising:
   a pair of transistors each having first and second common electrodes and base electrode, the first electrodes being connected together and grounded;
   a first pair of resistors connected respectively to the base electrodes of said pair of transistors;
   a pair of diodes connected respectively between the base electrodes of said pair of transistors and ground with the anode of one diode and the cathode of the other diode connected to said base electrodes;
   AC signal means connected to said first pair of resistors for providing simultaneous opposite polarity signals thereto;
   a second pair of resistors connnected in series between the second electrodes of said pair of transistors, the junction of said resistors formed to be an output terminal; and
   a third pair of resistors each having one terminal connnected respectively to the second electrodes of said pair of transistors and the other terminal formed to be connected to oppositely polarized DC signals.

2. An electronic chopper circuit according to claim 1 wherein said AC signal means further comprises:
   a transformer with a secondary winding having its opposite ends connected respectively to said first pair of resistors.

3. An electronic chopper circuit according to claim 2 wherein:
   one of said pair of transistors is an NPN-type and the other of said pair of transistors is a PNP-type.

4. An electronic chopper circuit according to claim 3 wherein:
   said first electrodes are collectors and said second electrodes are emitter.

5. A DC positioning servo loop comprising:
   a pair of transistors each including first and second common electrodes and base electrode, the first electrodes being connected together and grounded;
   a first pair of resistors connnected respectively to the base electrodes of said pair of transistors;
   a pair of diodes connnected respectively between the base electrodes of said pair of transistors and ground with the anode of one diode and the cathode of the other diode connected to said base electrodes;
   AC signal means connected to said first pair of resistors for providing simultaneous opposite polarity signals thereto;
   a second pair of resistors connected in series between the second electrodes of said pair of transistors having a junction formed therebetween;
   a third pair of resistors each having one terminal connected respectively to the second electrodes of said pair of transistors and the other terminal of each of said third pair of resistors formed to be connected to two oppositely polarized DC signals;
   an AC amplifier having an input connected to the junction of said second pair of resistors;
   a motor connected to receive the output of said amplifier and including an output shaft for positioning proportional to one of the oppositely polarized DC signals; and
   a potentiometer operatively connected to said output shaft for supplying the other one of said oppositely polarized DC signals to the other terminal of one of said third pair of resistors of an amplitude indicative of the shaft position.

6. A DC positioning servo loop according to claim 5 wherein said AC signal means further comprises:
   a transformer with a secondary winding having its opposite ends connected respectively to said first pair of resistors.

7. A DC positioning servo loop according to claim 6 wherein:
   said one of said transistors is an NPN-type transistor; and
   said other of said transistors is an PNP-type transistor.

8. A DC positioning servo loop according to claim 7 wherein:
   said first common electrodes are the collector electrodes; and said second common electrodes are the emitter electrodes.

9. A DC positioning servo loop wherein a square wave signal is applied to the input of an AC amplifier whose electrical output drives a servomotor that is mechanically coupled to a wiper arm of a potentiometer wherein said potentiometer has a resistive circuit having terminals at a first and second end and one end of said wiper arm is positioned intermediate of said first and second ends and the mechanical angle of said servomotor determines the position on said resistive circuit of said wiper arm wherein the improvement comprises:
   an NPN and PNP transistor with each transistor having an emitter, collector and base electrodes with said collector electrodes connected together and grounded;
   a first pair of resistors connected respectively to the base electrodes of said pair of transistors;
   a pair of diodes connected respectively between the base electrodes of said pair of transistors and ground with the anode of one diode connected to the base of the PNP transistor and the cathode of the other diode connected to the base of the NPN transistor;
   a stepdown transformer with a secondary winding having its opposite ends connected respectively to said first pair of resistors for providing simultaneous opposite polarity signals;
   a second pair of resistors having a junction formed therebetween serially connected between said emitter electrodes on said NPN and said PNP transistors, said AC resistors, input connected to said junction;
   a third pair of resistor, each having one terminal connected respectively to the emitter electrodes of said pair of transistors;
   said potentiometer having said first end of said potentiometer resistive circuit grounded and the other end of said wiper arm is connected to the other terminal of one of said third pair of resistors;
   a positive DC signal source connected to the other terminal of the other of said third pair of resistors; and
   a negative DC voltage source is connected to said second end of said potentiometer resistive circuit.

UNITED STATES PATENT OFFICE
CERTIFICATE OF CORRECTION

Patent No. 3,609,499                    Dated  September 28, 1971

Inventor(s)  Ronald C. Scheerer et al

It is certified that error appears in the above-identified patent and that said Letters Patent are hereby corrected as shown below:

Column 4, line 46, "on" should read -- of --; line 47, "resistors," should read -- amplifier --; line 48, "resistor" should read -- resistors --.

Signed and sealed this 28th day of March 1972.

(SEAL)
Attest:

EDWARD M. FLETCHER, JR.                 ROBERT GOTTSCHALK
Attesting Officer                       Commissioner of Patents